Feb. 28, 1928.

W. H. VIBBER 1,660,498

ELECTRIC GROUNDING CONNECTION

Filed Feb. 6, 1925

Inventor:
Wheeler H. Vibber
by Henry C. Thomson
Atty.

Patented Feb. 28, 1928.

1,660,498

UNITED STATES PATENT OFFICE.

WHEELER H. VIBBER, OF NEW LONDON, CONNECTICUT, ASSIGNOR OF ONE-HALF TO THE GILLETTE-VIBBER CO., OF NEW LONDON, CONNECTICUT, A CORPORATION OF CONNECTICUT.

ELECTRIC GROUNDING CONNECTION.

Application filed February 6, 1925. Serial No. 7,372.

This invention relates to grounding and bonding electrical circuits and conduits and more particularly to an improved ground connection to a water pipe or other piping system. A principal object of the invention is to provide a simple, effective and reliable means for connecting a conduit and a ground wire to a water or other grounding pipe, such means including provision whereby the protective conductor pipe or tube in which the ground wire is encased may be securely clamped to the grounding pipe in any desired angular relation thereto. The foregoing and other objects and advantages of the invention will more fully appear from the following detailed description taken in connection with the accompanying drawings, and the distinctive features of novelty will be pointed out in the appended claims.

Referring to the drawings:

Fig. 4 is an elevation partly in section showing a modified form of the invention.

Figure 1:
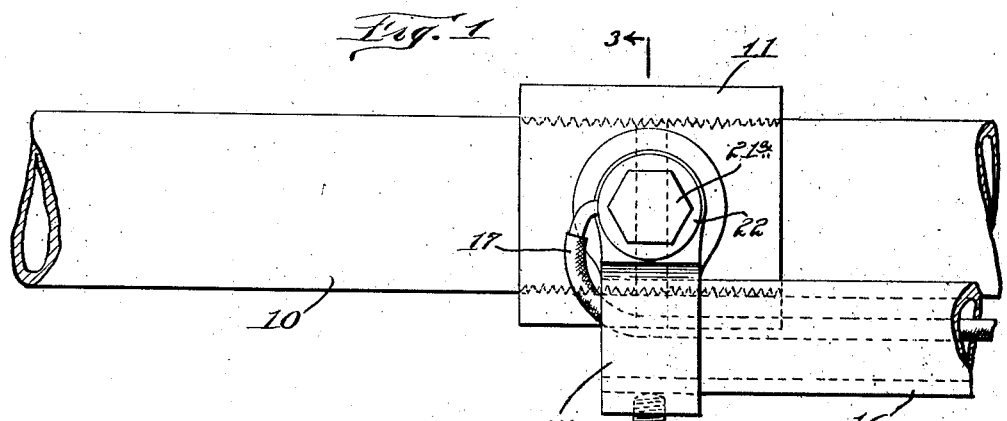
Fig. 1 is an elevation showing an embodiment of my invention and showing a portion of the grounding pipe and also of the protective conductor pipe.
Figure 2:
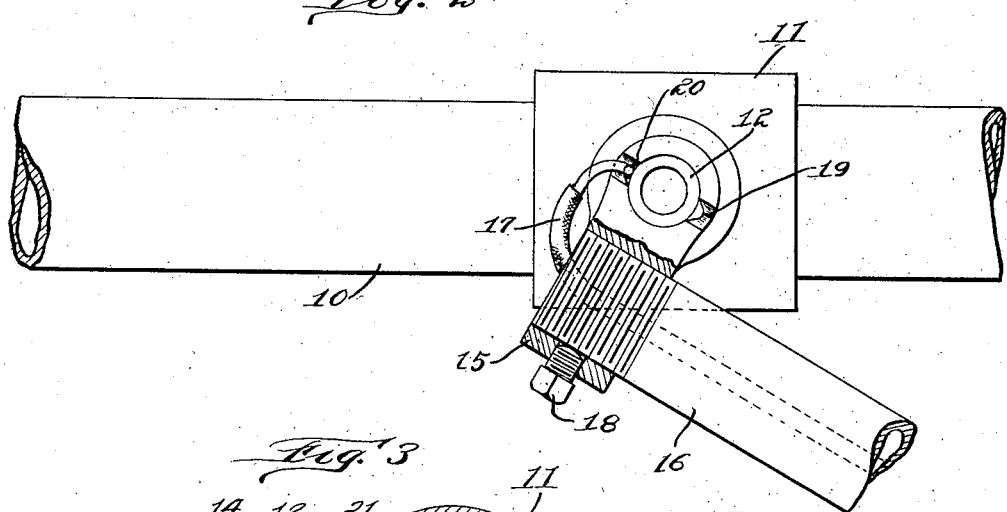
Fig. 2 is a similar view with a clamping member removed and with a portion in section.
Figure 3:
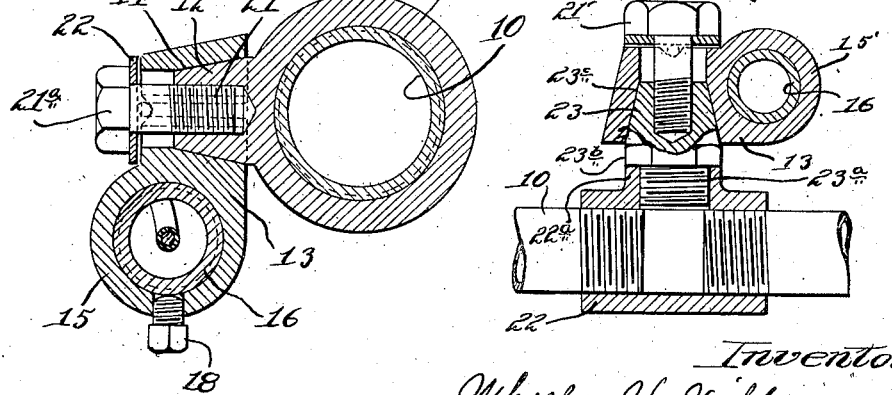
Fig. 3 is a transverse section on the line 3—3 of Fig. 1.

10 indicates a ground pipe such as a water pipe employed in the ordinary water service of a building. 11 indicates a fixture in the form of an internally threaded coupling securing adjacent ends of the water pipe sections together. In accordance with my invention in its present preferred embodiment, this coupling is specially formed with a tapering or frusto-conical boss 12 at one side and intermediate the length thereof. 13 indicates a bracket head or conduit holder having one portion thereof formed with a tapering socket 14 adapted to fit upon the boss 12 and having another portion thereof formed as an internally threaded collar or bracket 15, the threaded bore of which is adapted to receive the externally threaded extremity of a protective conductor pipe or conduit 16, which conductor pipe may be clamped securely to the collar 15 by a set screw 18. Grooves 20 extend from one end of the socket 14 to the other along diametrically opposite portions of the inner socket wall, either of these grooves being adapted to receive the exposed end portion of the conductor wire 17 and each groove 20 is extended outwardly across the outer end of the socket 14 as indicated at 19. The boss 12 is tapped to receive a screw 21 for clamping the holder 13 to the pipe coupling 11. A washer 22 applied under the head 21ª of the screw 21 is adapted to engage and clamp the wire 17 firmly in one of the notches 19, while as said screw is set up the extremity of the wire tucked into the socket wall notch 20 is pressed firmly against the boss 12 thus insuring an effective contact area at all times of the conductor wire with the grounding pipe. As will be noted from a comparison of Figs. 1 and 2 it is possible to adjust the protective conductor 16 at any desired angle with respect to the grounding pipe and on then setting up the screw 21 the conductor is securely locked in such position and is immovably secured to the grounding pipe. In the form of the invention shown in Fig. 4 I may employ a standard T fitting 22 in the grounding pipe 10. In this case I provide a tapered spindle 23 which has at one end a threaded nipple extremity 23ª adapted to screw into the leg portion 22ª of the T fitting. This spindle may have an intermediate squared or hex portion 23ᵇ to receive a wrench. The tapered outer portion 23ᶜ of this spindle is adapted to receive a tapered socket of a bracket head 13' which may be in all respects similar to the bracket head 13 already described and having a screw 21' tapped into the spindle to clamp this bracket head thereto. The collar socket 15' of this bracket head to receive the protective conduit may be the same as the collar already described; and it is here to be understood that in either case this socket may extend at any angle to the tapered socket or it may be parallel therewith as may be found necessary or desirable.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. An electric connection comprising a fixture for attachment to a grounding pipe, a fixture for attachment to a conduit bearing a conductor wire, one of said fixtures having a tapering socket and the other fixture having a tapering boss shaped to fit within said socket, and means for rigidly securing said fixtures together with said boss seated within said socket and for clamping one end of the conductor wire to one of said fixtures.

2. An electric connection comprising a fixture for attachment to a grounding pipe, a tapering boss on said fixture, a fixture for attachment to a conduit bearing a conductor wire, said fixture having a tapering socket shaped to fit said boss, and clamping means for rigidly securing said fixtures together in any desired angular position of one relatively to the other about the axis of said boss and for securing said wire to one of said fixtures.

3. An electric connection comprising a coupling for connecting two sections of piping, a tapering boss on said coupling having a tapped hole therein, a conduit holder having a tapering socket for fitting said boss, and a clamp screw engaged within said tapped hole for securing the conduit holder to said coupling in any desired position of adjustment about said boss as a pivot.

4. An electric connection comprising an internally threaded pipe coupling, a frusto-conical boss on said coupling having its axis intersecting the axis of said coupling at right angles, a conduit holder having a tapering socket to fit said boss, the inner wall of the socket being grooved to receive a conductor wire, and means for wedging said boss within said socket and for clamping said wire within said groove.

5. An electric connection comprising a coupling for connecting two pipe sections, a boss on said coupling having a tapped hole therein, a bracket having a socket to receive said boss and a bore for receiving a conduit bearing a conductor wire, the inner wall of the socket being grooved to receive one end of said wire inserted between said boss and said bracket, and a clamp screw engaged within said tapped hole for adjustably securing said bracket to said coupling.

6. An electric connection comprising a coupling for connecting two sections of grounding pipe, a boss on said coupling having a tapped hole therein, a bracket adapted to be fitted over a conduit and having a socket to receive said boss, the inner wall of the socket having a groove and the outer end thereof having a cross-notch registering with said groove, a conduit in said holder carrying a conductor wire having a protruding end inserted between said boss and said socket and lying across said notch and in said groove, and a headed clamp screw engaged within said tapped hole for adjustably securing said bracket to said coupling.

In testimony whereof I affix my signature.

WHEELER H. VIBBER.